March 29, 1927.

L. C. DE FOREST 1,622,309

DATE PITTER

Filed Feb. 17, 1926

Inventor
LESTER C. DE FOREST.

by Stockbridge & Borst
Attys

Patented Mar. 29, 1927.

1,622,309

UNITED STATES PATENT OFFICE.

LESTER C. DE FOREST, OF WESTFIELD, NEW JERSEY, ASSIGNOR TO HILLS BROTHERS COMPANY, INC., A CORPORATION OF NEW YORK.

DATE PITTER.

Application filed February 17, 1926. Serial No. 88,803.

My invention is designed for the production of a novel construction of date pitter by means of which a longitudinal incision may be made in the flesh of the date up to the surface of the pit, the flesh may be separated on opposite sides of the incision, and the pit may be gripped so that it can be readily removed from the fleshy portion of the date.

The improved device consists of a pair of outwardly spring-pressed cutting jaws, the ends of which are sharpened and adapted to be brought into close contact one with the other.

It also consists of a pair of outwardly spring-pressed jaws, having cutting edges at the ends thereof adapted to be brought into contact with each other and having pit-engaging means on their inner surfaces adjacent their cutting edges.

It also consists in certain details and features of construction which will be hereinafter more fully described and claimed.

In the drawing forming part of this specification,

Like reference numerals indicate like parts of the different views.

Figure 1:
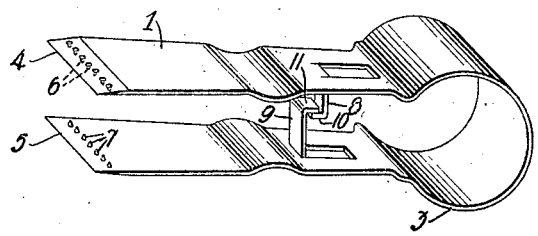
Figure 1 is a perspective view of my improved tool.
Figure 2:
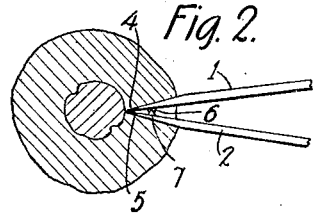
Figure 2 is a detail view, showing the jaws of device compressed in the act of making an incision in the flesh of a date.
Figure 3:
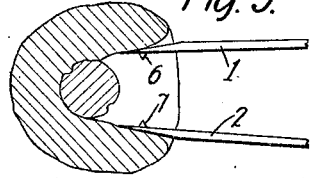
Figure 3 is a similar view, showing the jaws separated to enlarge the incision.
Figure 4:
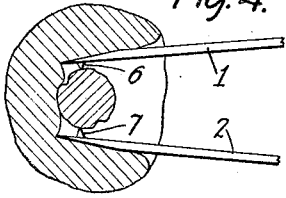
Figure 4 is a similar view, showing the teeth on the jaws engaging the pit of the date.

In the embodiment of my invention shown in the drawing, the outwardly spring-pressed cutting and gripping jaws 1 and 2 are made from a single strip of sheet metal, the same being connected by an arcuate portion 3 which is so shaped as to create a constant tendency on the part of the jaws 1 and 2 to separate,—that is to say, the major portion of the spring action tending to separate the jaws 1 and 2 is effected by the arcuate portion 3. The material of the jaws 1 and 2 is cut away adjacent the arcuate portion 3 so that the latter is wider and consequently stiffer than said jaws.

The free ends of the jaws 1 and 2 are provided with cutting edges 4 and 5, which are substantially straight and of a length corresponding with the average length of a date and the inner surfaces of said jaws adjacent said cutting edges have been shown as provided with teeth or pit-engaging portions 6 and 7. The teeth 6 lie in staggered relation to the teeth 7, so that when the cutting edges 4 and 5 are brought into contact with each other, one set of teeth will fit within the spaces between the other set.

Means are provided for limiting the outward movement of the jaws 1 and 2. The specific means shown for accomplishing this result consists of a pair of interlocking hooks 8 and 9. The hook 8 may be formed by slotting the arm 1 to form a tongue which is bent downwardly at right angles to the jaw 1 and has its end bent at right angles thereto, as shown at 10. Similarly the hook 9 may be formed by slotting the material of the jaw 2 to form a tongue, which is bent upwardly at right angles to said jaw and has its end turned in the opposite direction to the end 10. The ends 10 and 11 constitute the hooks of the retaining device, and they are so disposed that they will engage each other to resist the outward movement of the jaws 1 and 2, while permitting of the inward movement thereof.

In using my improved device the jaws 1 and 2 are compressed so as to bring the free ends thereof, which are provided with the cutting edges 4 and 5, into contact with each other. The jaws then lie at a sharp acute angle to each other. In this position the cutting edges 4 and 5 are introduced into the fleshy portion of a date until they reach the pit at the center thereof. The incision made should preferably extend throughout the length of the date, for which reason the width of the jaws 1 and 2 at their cutting edges corresponds approximately to the average length of a date. The jaws 1 and 2 are now released and, through the spring action of the arcuate portion 3, the cutting edges 4 and 5 are caused to separate until their movement in opposite directions is arrested by the engagement of the hooks 8 and 9 one with the other. This separation of the cutting edges 4 and 5 spreads and opens up the fleshy portion of the date on opposite sides of the incision, rendering the pit accessible. The jaws 1 and 2 are now slightly compressed to fit into the fleshy portion of the date so that the cutting edges 4 and 5 thereof may pass over the upper and lower surfaces of the pit, and the teeth 6 and 7 are brought into contact with the pit. With the flesh of the date thus completely opened on one side and a grip being obtained upon the pit thereof, the latter may be readily withdrawn by holding the ends of the date with one hand and withdrawing the tool with the pit attached thereto by the other.

While I have described my improved tool in the form which at present is a preferred form, it is obvious that various changes may be made in the construction thereof, and I do not desire to be limited to the specific construction of the device herein shown, except as defined by the appended claims.

Having now described my invention, I claim:

1. A tool for pitting dates comprising a pair of outwardly spring-pressed jaws, having straight, elongated cutting edges at the ends thereof, the said cutting edges being parallel to each other and adapted to be moved and held in contact with each other.

2. A tool for pitting dates comprising a pair of outwardly spring-pressed jaws, having cutting edges at the ends thereof adapted to be brought into contact with each other and having rows of teeth on their inner surfaces adjacent their cutting edges.

In witness whereof, I hereunto subscribe my signature.

LESTER C. DE FOREST.